May 15, 1962          B. NOBLE          3,034,590

AUTOMATIC BATCHING PLANT

Filed March 20, 1957          6 Sheets-Sheet 2

INVENTOR.
BERT NOBLE
BY
ATTORNEY

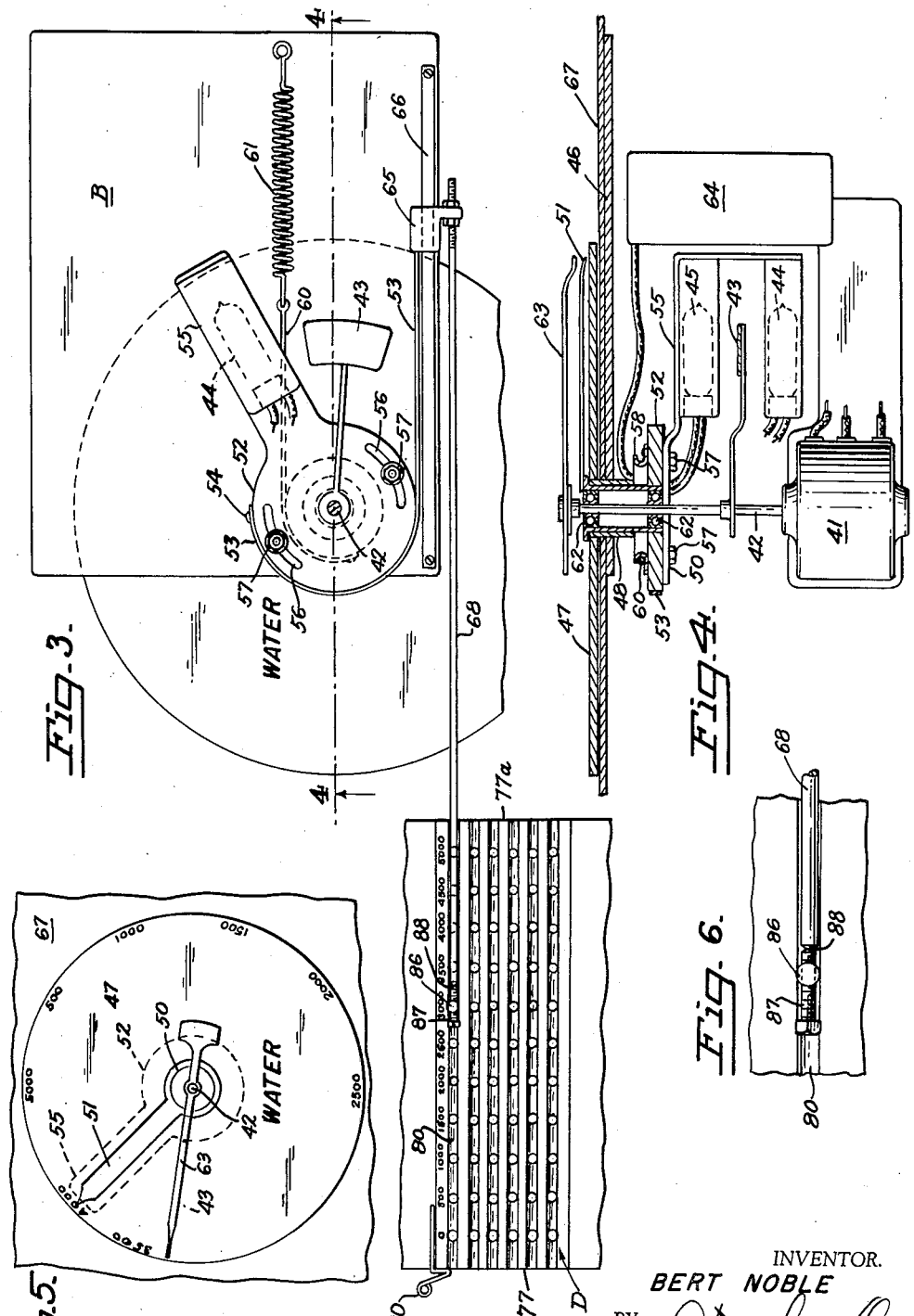

May 15, 1962　　　　　　　　B. NOBLE　　　　　　　　3,034,590
AUTOMATIC BATCHING PLANT
Filed March 20, 1957　　　　　　　　　　　　　　　　6 Sheets-Sheet 4

INVENTOR.
BERT NOBLE
BY
ATTORNEY

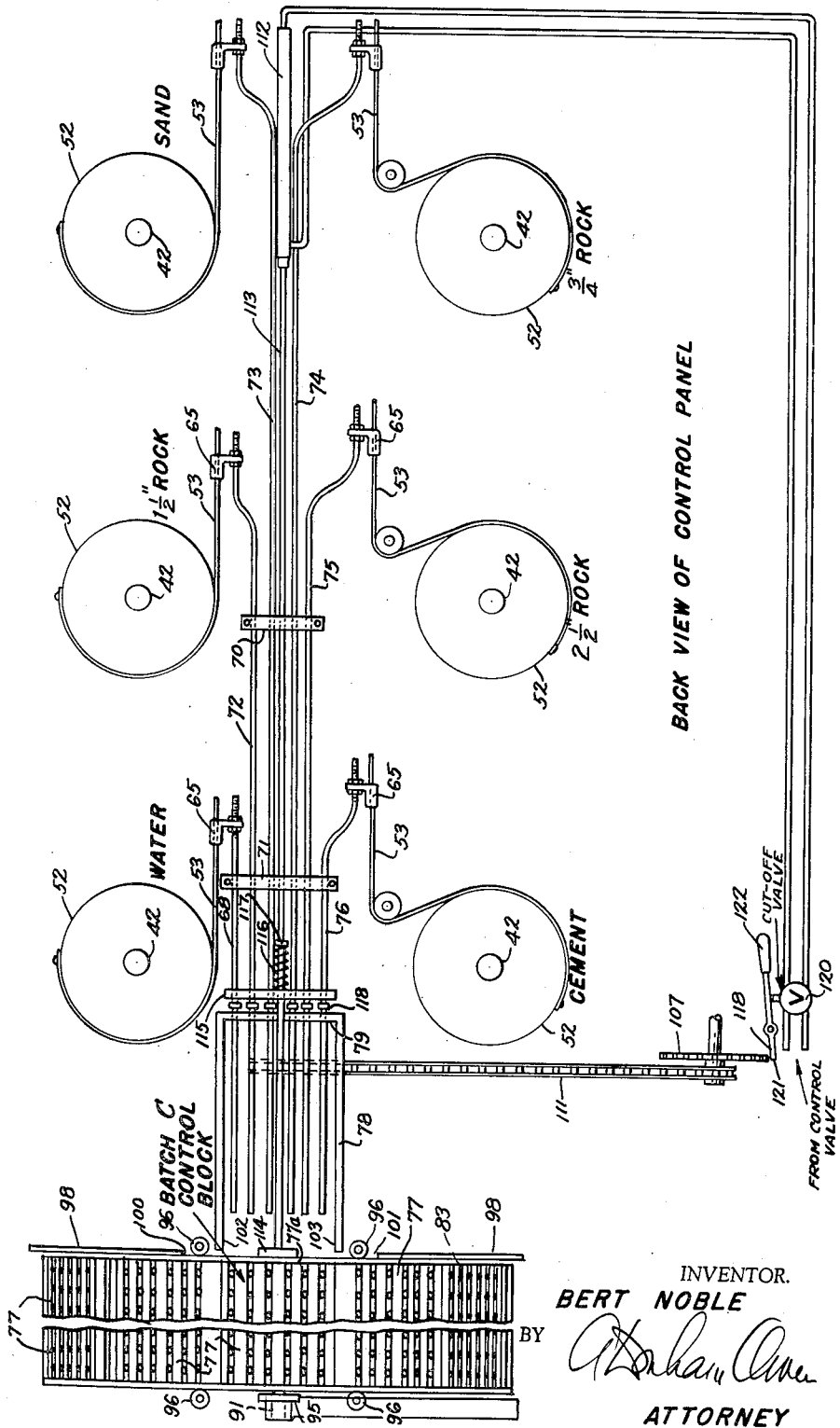

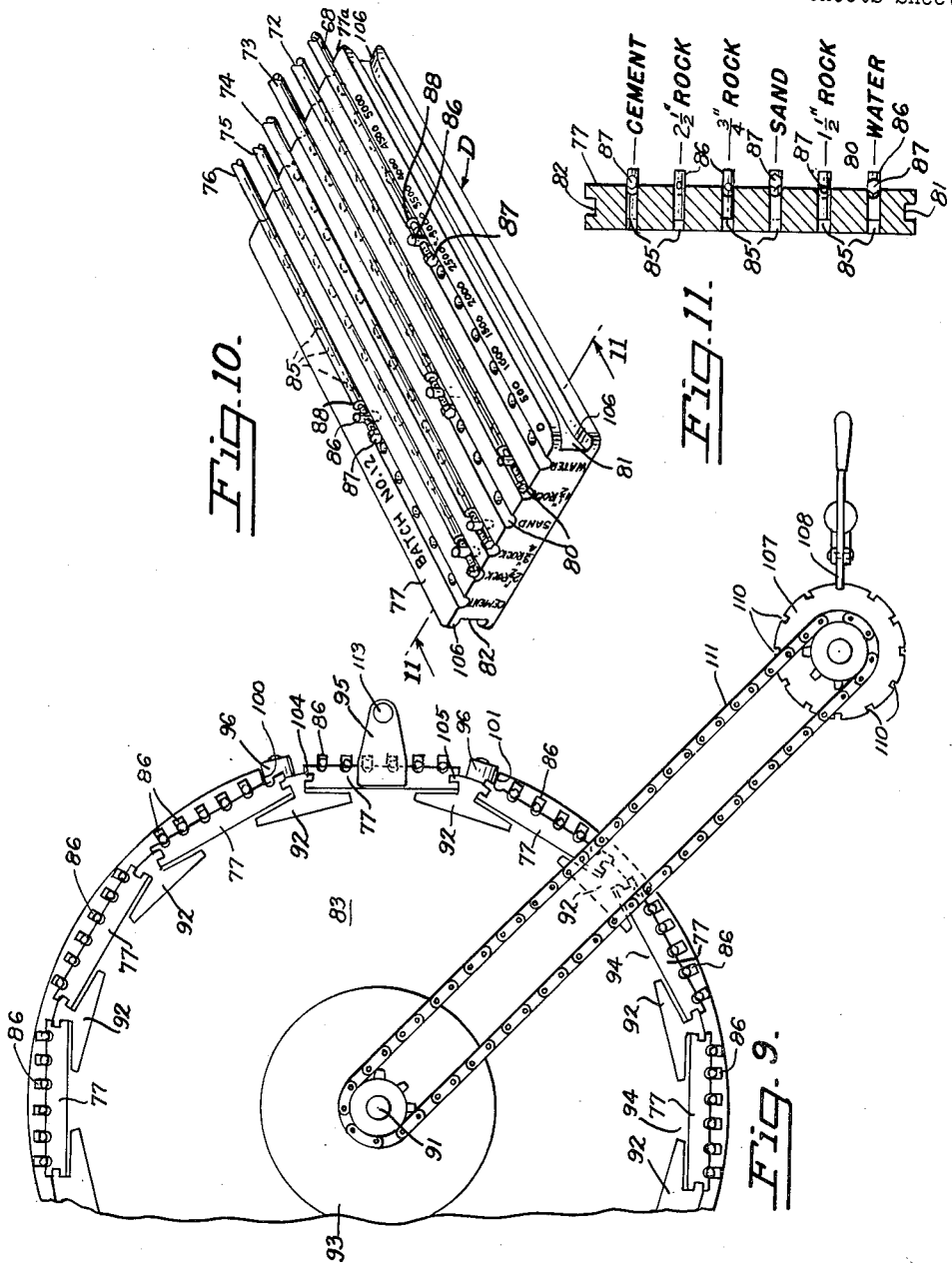

United States Patent Office 3,034,590
Patented May 15, 1962

3,034,590
AUTOMATIC BATCHING PLANT
Bert Noble, Rte. 1, Box 254A, Davis, Calif.
Filed Mar. 20, 1957, Ser. No. 647,245
10 Claims. (Cl. 177—70)

This invention relates to batching plants and in particular to such plants in which a plurality of ingredients are to be weighed out simultaneously in various pre-selected combinations, each of predetermined proportions of the several ingredients.

The object of the invention is to provide a weighing and batching mechanism by which several different pre-selected weights of each aggregate can be arranged to be weighed selectively on a given batcher scale and in which the pre-selected weight settings of each aggregate can be reset remote from the weighting mechanism; in which any number of pre-selected batches can be set up, each on an individual batch control block, and can be weighed out with the operator doing no more than inserting into the control mechanism a control block with the desired setting; in which all lever and linkage connections between the operator's control stand and the weigh batchers and scales are omitted and the connection is by electric wiring laid in simple conduits; in which a high degree of accuracy of weighing is accomplished; in which the control and scale elements may be made in units and assembled quickly to provide a batching plant of any desired capacity from a small pre-mix concrete plant to the most complicated plant requiring the batching of many aggregates, cement, water, additives, etc.

Modern construction projects, such as dams and other large structures of concrete, are usually carried on with several different parts of the concrete structure being poured simultaneously. Different parts, such as the power house, the spillway, the diversion tunnels, the outside face of the dam, the mass concrete, the railings, the buckets, etc., call for concrete having different characteristics. These characteristics are determined by the relative proportions of the various sizes of aggregates, and cement and water. Sometimes ice and other elements are added to the mix. This means that the modern batching plant must have a means of making instantaneous changes to a pre-selected mix without taking the operator's time from other duties or having to rely upon his noting the weights changed to. The modern batching plant must be equipped to mix in succession batches of different pre-selected composition and to do this under the control of the operator, but requiring no more of his time than is necessary to operate the control means to select the desired mix. Although a concrete batching plant is mentioned, the device is equally useful in chemical plants, food plants and other plants weighing bulk materials.

A ready-mix plant is a good illustration of a plant where the needs of many customers are catered to, requiring, during a typical day, the weighing up (batching) of perhaps fifty differently proportioned batches. The present invention saves time because in a suitable storage rack within reach of the operator at the control panel may be a hundred or more batch control blocks, each indexed and set to a customer's particular specification. Each batch control block can be numbered; so the customer orders by number, the order clerk uses the same number on the invoice, the plant operator batches by inserting the control block with the same number, and the truck driver in delivering the mix to the job uses the same number so that the job superintendent knows immediately the contents of the mix and by reference to the job specification knows where it is to be poured. The above solves the old problems of the batch plant operator having to reset the scales each time there was a batch change, and of the office, the truck driver, and the job superintendent never having a simple reference or code symbol to identify the contents of the batch.

Another problem solved by this invention is the one of space in the already crowded mixer house, because by the means described herein, the control panel which sets the contents of the mix can be far removed from the scales and the weigh bins. Electric wires only are needed to span the distance between the scale and the weight setting control board, whereas, heretofore, pivoted linkage was needed. The elimination of the linkage also gives more space in the mixer house.

While I shall describe primarily the weighing means and the batch control means, it will be obvious therefrom that a like connection may be made between the same scale transmitter motor and a receiver motor operating a recorder mechanism for printing a record of the mix.

For purposes of disclosure the invention will be described as one for weighing up any one of twelve pre-selected mixes composed of water, cement and several sizes of aggregates. This will permit the drawings and the description to be kept relatively simple while still making a full disclosure of the principles of the invention. In actual practice, some mixes will contain more than water, cement, and the foregoing aggregates, in which case the basic elements of the machine are duplicated as explained herein. Also more or fewer than twelve pre-selected mixes may be provided for in the control block positioning mechanism.

In the drawings:

FIG. 3 is a view in vertical elevation of the back side of one of the control dial mechanisms on the control panel with a batch control block held in operative relation to it;

FIG. 4 is a view in cross section taken on the line 4—4 in FIG. 3 showing the control dial drive motor, the photocell relay mechanism, and the flag to cut the light beam of the latter;

FIG. 5 is a fragmentary view in vertical elevation of the control panel showing one dial;

FIG. 6 is a detail of one of the adjusting screws on the batch control block;

FIG. 8 is a view in vertical elevation of the back side of the control panel of FIG. 7, with the batch control block removed from its slot in the panel; therefore all the control dials are at their zero positions;

FIG. 9 is a schematic view in vertical elevation of one form of wheel adapted to carry twelve batch control blocks and the indexing control lever;

FIG. 10 is an isometric view of one form of batch control block with a single weight control pin in the slot that will control the ¾" rock weigh hopper, as in FIG. 7; and FIG. 11 is a view in cross section taken on the line 11—11 in FIG. 10.

In presenting this description and embodiment of the invention it is not intended thereby to limit the invention to this one embodiment as each manufacturer may vary each of the elements which make up the combination covered by the claims.

Nor is it my intention to limit the invention to the batching of concrete, as it is equally valuable in batching other ingredients for other purposes.

An underlying concept of the present invention is to employ a separate scale A for each weigh hopper; to employ a control cut-off mechanism B for each bin; to provide an electrical connection such as a Selsyn motor and a slave motor between each scale and its control cut-off so the latter moves in unison with its scale; and to provide means C for setting the cut-off point of each control which includes a batch control block D insertable in position to set the cut-off point of each control so that each scale will weigh out just what its control cut-off setting calls for.

Figure 1:
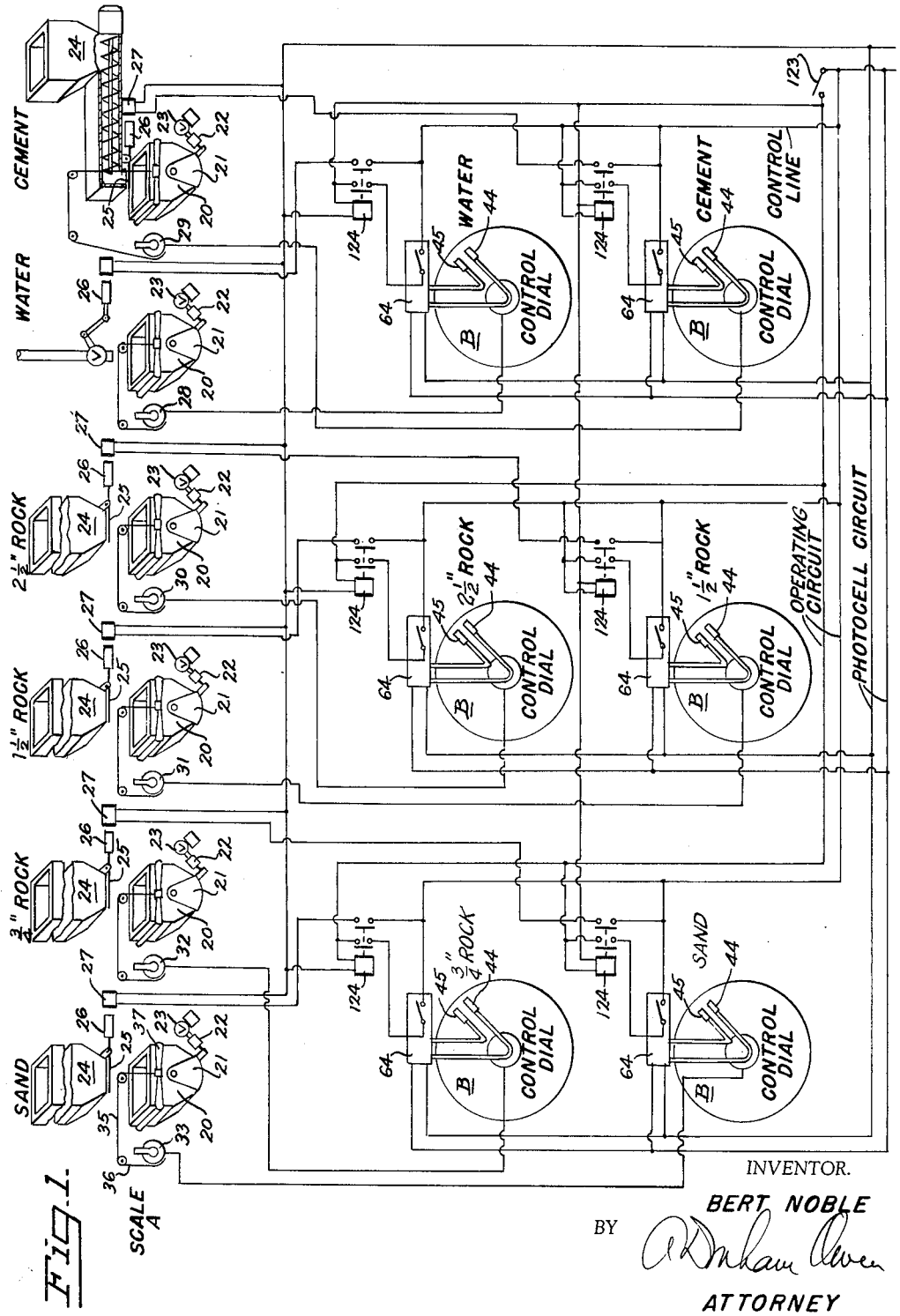
FIG. 1 is a schematic view of the supply hoppers, the weigh hoppers, the scales, and the remote electrically connected control dials.

As shown diagrammatically at the top of FIG. 1, the batching plant is composed of a plurality of batchers each having its own weigh hopper 20 in each of what is weighed out the amount of its particular element that is to go into a selected mix. Each weigh hopper has a gate 21 and a ram 22 for opening the gate. A magnetic air valve 23 regulates the flow of air to one end of the ram and a spring moves the ram to close the gate. Above each weigh hopper 20 is a storage hopper 24 also having a gate 25 and a ram 26 controlled by a magnetic air valve 27 to open and close the gate.

To avoid complication the batcher will be assumed to be one having only six separate batching means, each with its scales 28 for water, 29 for cement, and 30, 31, 32, 33 for the different aggregates. In most installations there will be more than six batchers, but six are sufficient to illustrate the principles of the present invention.

The scales preferably are of the dial type so that movement of each weigh hopper 20 will result in rotary motion of a shaft 34 in the scale. In FIG. 1 the scales are only shown diagrammatically at 28, 29, 30, 31, 32 and 33 because this type of scale is well known in this art. Each is connected by a suitable lever system 35 and a strap 36 to the splice levers 37 of its weigh hopper 20. On each scale shaft 34 is secured the armature 38 of a Selsyn-type motor 40, known in such systems as the transmitter motor. These armatures and the wiring are shown diagrammatically in FIG. 2 where each is connected to its slave motor 41. An individual slave motor 41 is shown in FIG. 4 where it rotates the shaft 42 in synchronism with the shaft 34 in the scale. It is the movement of this shaft 42 which brings the flag 43 in position to cut off the light 44 from the photocell 45 and thereby actuate the air ram 26 to close the bin door 25. More details of this photocell bin closing circuit are shown in FIG. 1 and will be explained later.

*The Control- Cut-Off Mechanism (FIGS. 3, 4, 8)*

One of the advantages of my invention is its flexibility in meeting whatever batching capacity is required for a particular plant. This is possible because with the Selsyn motor drive between each scale and its control cut-off mechanism, any number of scales may be included in a plant with a like number of control cut-off mechanisms. In other words, my invention makes possible a unitized type of construction, with resultant economies in manufacture, assembly, and ease of servicing by replacement of any defective unit with another like unit. Also, it will make it simpler to explain the invention, for when the structure and functioning of one unit is understood, the concept of the complete plant is clear for it comprises a plurality of such units.

In FIGS. 3 and 4, I show one of the control cut-off units B mounted in its unitized frame 46 with a dial 47 secured to it by the sleeve bushing 48 which also serves as a bearing for the rotatable photocell mounting hub 50. On this hub at one end is mounted the indicator hand 51 and at the other end the wheel 52, on the periphery of which the tape 53 rolls and its end is secured by the screw 54. On one face of wheel 52 is secured the photocell mounting bracket 55 with its slotted holes 56, permitting adustment for proper synchronization by loosening the nuts 57. On its other face is secured a grooved pulley 58 in which is fastened a cable 60 having its other end fastened to the spring 61. The latter functions to return the photocell assembly to the zero cut-off point when the batch control block D is removed from its slot. Also, the spring 61 functions to hold this weighing unit at the zero point when a particular batch does not call for any of the ingredient it controls.

The shaft 42 of the Selsyn slave motor 41 is shown as mounted in ball bearings 62 secured in the hub 50, but this particular manner of mounting is not important, so long as the shaft 42 can move without any appreciable drag. The scale weight indicator hand 63 is mounted on shaft 42, as is the flag 43. When the hand 51 and the photocell assembly carried on the bracket 55 have been set at the weight desired, the flow of aggregate into the hopper will cause the indicator hand 63 and the flag to move. If the parts are properly adjusted, the hand 63 will overlie hand 51 at the instant the flag 43 cuts the light beam from 44, thereby actuating the photocell relay 64 which in turn will close the bin gate 25, and the hopper 20 will have in it the predetermined and desired weight. I have not illustrated the circuits for emptying the hoppers 20, or initiating the weighing cycle as those features are now well known in this art and are disclosed in my earlier patents, such as 2,607,555 and 2,607,579.

One end of the strap 53 (FIG. 3) is secured at 54 to the wheel 52 and its other end to a traveler 65 slidable on the track 66 mounted parallel to and on the back side of the main control panel 67. The traveler 65 also serves as a mounting for one end of the setting rod 68. In FIG. 3 these parts are shown only diagrammatically, while in FIG. 8 the setting rods are shown slidably mounted in suitable bearing blocks 70, 71.

The setting rods 72, 73, 74, 75 and 76 are connected respectively to the straps 53 on the 1½" rock, sand, ¾" rock, 2½" rock, and cement, control cut-off units B. It will thus be clear that the photocell cut-off device on each bracket 55 will be rotated from its zero position when its setting rod is moved, and to the extent that it is moved. Note in FIG. 8 all the rods are at zero position because there is no batch control block 77 in place in the frame 78. It is the batch control block which selects the amount of each ingredient that is to be weighed out for a particular batch.

*Batch Control Blocks (FIGS. 10 and 11)*

Each block 77 preferably has grooves 80 extending longitudinally along one face, each to receive and to guide the free end of a setting rod. The grooves 81 and 82 in the edges of the block guide the block when it is in the carrier frame 83 and when it is inserted into the frame 78. Each groove 80 has a row of equally spaced holes 84 which correspond to the readings on the dials of the weighing scales 29 to 33 and on the dials 47 of the several control cut-off mechanisms B. The ratio between the diameter of the wheel 52 (FIG. 3) and the length of the grooves 80 is such that for the hand 63 to move over the full sweep of the dial 47, say from a zero reading to a 5000 reading (maximum for the scale), the strap 53 and its connected setting rod 68 will move the distance between the outermost holes 85 in the groove 80. The intervening space in the groove 80 is then divided up into distances, each of which will move the setting rod 68 the equivalent of 500# on the scale, and a hole 85 is drilled in the bottom of the groove at each such point, with the result as shown in FIG. 10 where the batch control block 77 has eleven holes 85 in each groove 80. The inner end of the block forms a reference surface 77a, which can bear against or be held close to a reference surface 79 of the frame 78.

For each groove 80 I provide an insertable plug 86 which makes a snug friction fit in any one of the holes 85. Threaded in a hole in the upper end of the plug is a micro measuring screw 87 (see FIGS. 6 and 10) by means of which the weight setting in each groove and between each pair of holes 86 can be accurately set. For example if the end 88 of the screw 87 is flush with the edge of the plug 86 the weight will be set at one of the multiples of 500. If the end 88 is fully extended it can reach all the way to the far edge of the next hole 80. Therefore, to set the batch control for a weight within the 500 pound range of the micro screw 87, it is adjusted to the correct amount. This is shown in FIG. 10 where the weight setting in the groove controlling the sand batcher is 1750 pounds. This is accomplished by inserting the plug in the hole 85 at the 1500 pound point and then screwing the screw 87 out so its end 88 has added 250 pounds. Thus when the batch control block 77 is inserted and locked in the frame 78 by the latch 90 the end of the rod 73 which controls the sand cut-off mechanism will be in contact with the end 88 of the screw 87 and the dial hand 51 will be in line with the 1750 pound marking on the dial 47.

In FIG. 3 the plug 86 is in the groove 80 that aligns with the rod 68 controlling the water scale and the screw 87 is set to weigh out about 3250 pounds of water.

In FIG. 10, one plug 86 is in the groove 80 that aligns with the rod 76 controlling the cement scale and the screw 87 is set to weigh out about 2600 pounds of cement. Another plug 86 is in the groove 80 that aligns with the rod 75 controlling the 2½" rock scale. It has the screw 87 screwed in so its end 88 is flush with the plug 86, and since the plug is in the first hole 85 (the zero point), there will be no 2½" rock weighed into this batch. An equivalent result can be obtained, that is a batcher can be inactivated, by removing the plug 86 from its groove 80. This will mean that there is nothing to contact the setting rod to cause it to move the weight cut-off mechanism and so none of that material will be included in the batch.

In setting the micro screws 87 the operator can get the final fine adjustment by placing the batch control block 77 in the frame 78 and then rotate each screw until it gives the desired weight reading by the pointer 51 on the control dial 47.

While I have described a block 77 having six grooves and six control units, it is understood that more or fewer of each may be used in a plant. Whatever the size of the plant, each one can have any number of the batch control blocks 77, so that each block can be given a certain batch designation, or be marked with a customer's name and designation. In this way the batch components are governed by the blocks with the pre-set plugs 86 and the micro screws 87, and all the operator has to do is to insert a desired block 77 in the frame 78. The operator need do nothing in setting the scales, for the block 77, when inserted, sets each of the scale control cut-off mechanisms B and the batching is out of the hands of the operator.

In a pre-mix plant for batching concrete, where there is to be no particular continuity or frequency in turning out the same batch, the operator, for each desired batch, may select from a rack the proper batch control block 77 and push it into the frame 78 to set the scale cut-off mechanisms. On the other hand, in a plant on a dam construction job where there is a frequent need for like batches and the number of different mixes is not too great, a magazine or carrier can be provided. One is shown schematically at 83 in FIGS. 7, 8 and 9 which will carry twelve of the batch control blocks. It can be made to carry more or fewer.

The magazine 83 is mounted on a suitable shaft 91 at one end of the control panel 67. The guides 92 extend co-axially with shaft 91 and are secured at one end to a hub 93 on that shaft. The guides are preferably spaced apart as at 94 to provide clearance, either for the operator's hand or for a mechanical pusher 95, for moving the selected batch control block 77 out of the magazine 83 into the frame 78. Suitable aligning rollers 96 serve to position each block 77 as it comes opposite the mouth 97 of the frame 78. This is desirable because the blocks 77 must be free to move out of the left side of the magazine when replacing one or more of the blocks and out of the right side of the magazine when a block is aligned with the frame 78. A fixed end guide plate 98 set close to the hub 93 of the magazine, serves as a stop to prevent the operator from pushing a block 77 too far to the right (FIG. 8) when loading the magazine. The plate 98 has a cut away portion between the radial edges 100 and 101 to leave an opening through which a block may pass as it goes into or out of the frame 78.

In FIGS. 8 and 9, I show schematically a form of power means for accomplishing the transfer of a batch control block 77 from the magazine into the frame 78 or vice versa. The frame 78 has the splines 102, 103 which align with like splines 104, 105 on the guides 92, and on which the grooves 81, 82 of each block 77 can slide. It is important to have accurate alignment of the spline 102 with the spline 104 and the spline 103 with the spline 105, even though the meeting ends of each are suitably tapered and the ends of the grooves 81 and 82 are suitably opened as shown at 106 in FIG. 10. For this purpose I show an indexing wheel 107 with a control lever 108 having an end adapted to fit in one of the twelve slots 110 in the wheel. A suitable chain 111 connects the wheel 107 to the hub 93 of the magazine so the two move together. When the lever 108 is locked in a slot 110, the splines 102, 103 are aligned with the splines 104, 105 and a batch control block 77 can be moved in or out of the frame 78.

In FIG. 8 I show diagrammatically a power ram 112, having a suitable source of fluid pressure supply, which can move any block 77 into or out of the frame 78. The piston in the ram is connected to the rod 113 which at its outer working end has the pusher fingers 95 and 114 spaced apart far enough that they clear the ends of the blocks 77 as the magazine is rotated. They are shown in this position in FIG. 8. Also mounted on ram rod 113 is a pusher 115 which embraces the push rods 68, 72, 73, 74, 75 and 76. The pusher 115 is slidably mounted on the ram rod and functions to apply a yielding pushing force on the push rods under the influence of the spring 116 secured by an adjustable collar and set screw 117. On each push rod 68, 72, 73, 74, 75 and 76 is an adjustable collar and set screw 118 shown to the left of the pusher 115 in FIG. 8. It will thus be clear that when the ram rod 113 moves to the left, the pusher 114 moves the block 77 out of the frame 78 into its slot in the magazine, and the pusher 115 engages the collars 118 and moves the push rods 68, 72, 73, 74, 75 and 76 into their zero positions. The springs 61 on each scale cut-off control unit B moved the scale control parts back to zero position at the same time as the block 77 moved out of the frame 78 and released the pressure on the push rods 68, 72, 73, 74, 75 and 76.

When the ram rod 113 moves to the right its pusher 95 engages the outer end of a batch control block 77, causing it to slide along the aligned splines and as it moves into the frame 78 each pre-set plug 86 engages its aligned push rod and its connected scale control unit B is set. In FIG. 8 at 120 I show a cut-off valve which can immobilize the ram 112. When the end 121 of the lever 108 can fit into a slot 110 in the indexing wheel (see FIG. 9) the operator can depress the handle 122 which will open the fluid lines to the ends of the ram 112. Thereafter, by another control valve (not shown) the operator can introduce fluid to either end of the ram to get the desired movement of the block 77, either into or out of the frame 78. The interlock with the wheel 107 prevents actuation of the ram when the splines 102, 103, 104 and 105 are not aligned.

A suitable cushioned shelf or receptacle near the magazine 83 directly opposite the frame 78 is preferable to act as a receiver for a batch control block 77 which may be ejected from the magazine by the pusher 95, if the block 77 being removed from the frame 78 is entering a space on the magazine already occupied by another block 77. This suggests that one way of taking out a batch control block no longer needed is to rotate the magazine to where that block is in line with the frame 78, then when the batch block 77 in the frame 78 is moved into the magazine the other block is automatically pushed out into the receptacle.

If desired, the operation can be arranged so that the magazine is not free to revolve except when there is no block 77 in the frame 78. This is accomplished by having the block 77 long enough so it remains partly in its recess in the magazine when in operative position in the frame 78.

Figure 7:
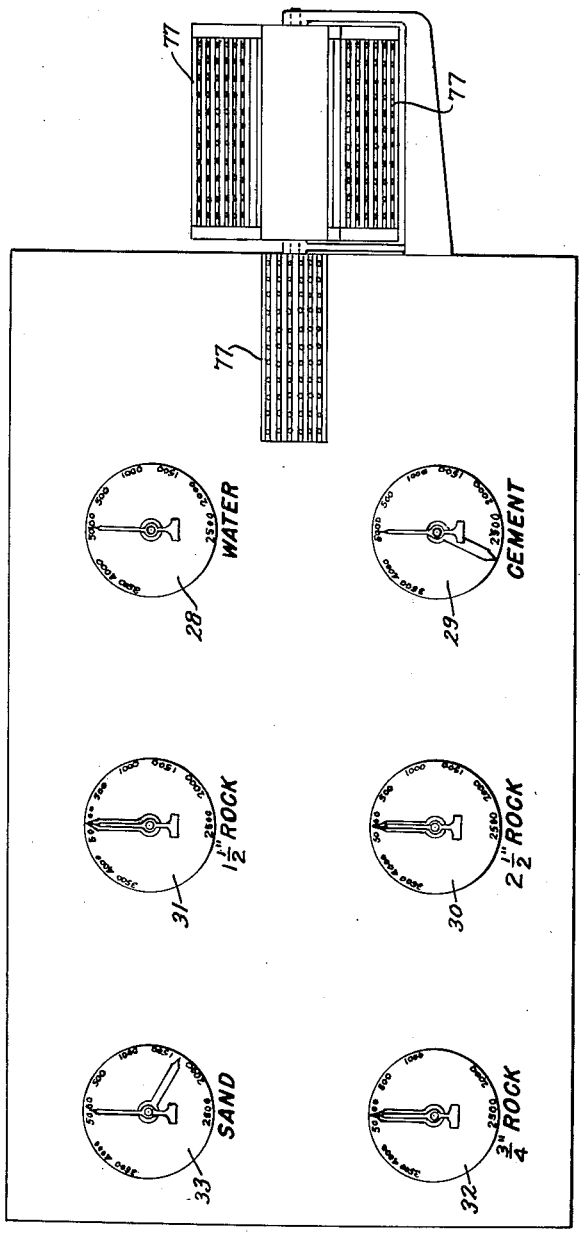
FIG. 7 is a view in vertical elevation of the dials on a control panel for a six scale batcher with one of the batch control blocks in operative position. In this case, it is set to weigh out only one ingredient as only the weight control pin for the ¾" rock is in place in the block, leaving the other five ingredient scales inactive.

The magazine arrangement shown in FIG. 7 is basically like the one described above, except that in this case the batch control blocks 77 are shifted into the frame 78 and out of it, by hand. This would be the type of installation suitable for small pre-mix plants.

Only a brief reference need be made to the photoelectric control circuit shown on FIG. 1, because such devices are well known in the scale art. (See my Patent No. 2,607,555, FIG. 2.) The circuitry is such that when the flag 43 moves in between the light source 44 and the photocell 45, the latter operates the photo relay 64 which in turn operates the air valve 27 and closes the gate 25 on the material bin. Likewise, as to the starting circuit, closing the switch 123 energizes the holding coil 124 which in turn actuates the air valve 27 and opens the material bin gates 25. These gates close individually as the scales reach the predetermined cut-off point as controlled by the units B where the photo relays 64 break the holding coil circuit in 124 which operates the air valve 27 to close the gate 25.

Figure 2:
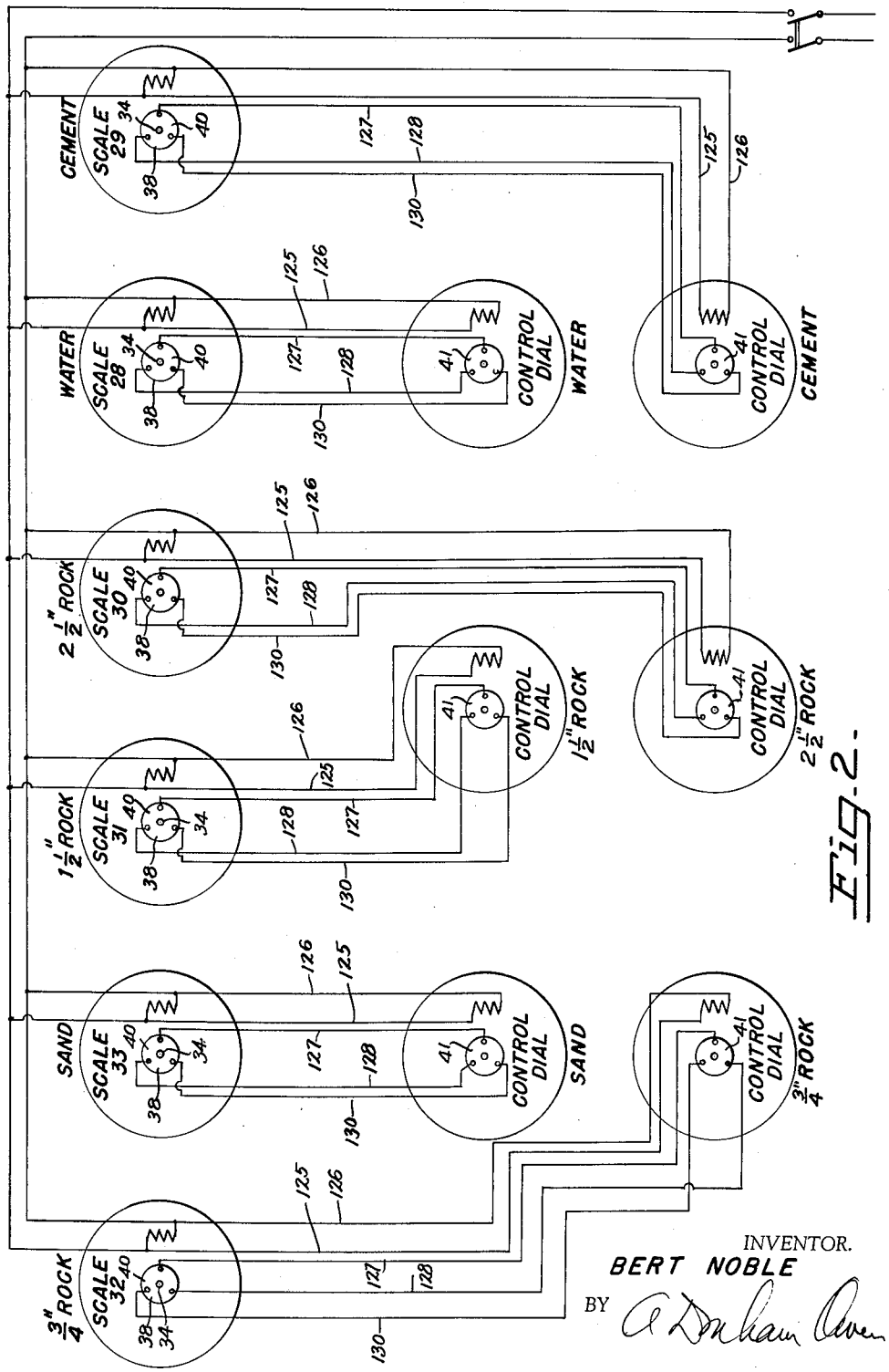
FIG. 2 is a more detailed view of the electrical drive means between the scale on each weigh hopper and its related control dial on the control panel.

FIG. 2 shows details of the Selsyn motor circuit between each scale with its transmitter motor 40, and the photocell control cut-off mechanism with its slave motor 41. The exciter circuits which set up the magnetic field are marked 125, 126. The three coils in the Selsyn are connected by the wires 127, 128 and 130. Details of operation of this portion of the device are given in the Weckerly Patent No. 2,208,284.

While I have described the batch control block device in relation to a Selsyn actuated scale control unit, I want it understood that the invention is equally adapted to forms of drive connection between the scale means and the control unit, other than a Selsyn system.

*Operation*

Before operating the batching equipment, the inspector (if it is a Government job, such as a dam) will have set up a plurality of batch control blocks 77 with the plugs 86 and screws 87 in each set to weigh out one of the batch mixes needed on the job. These blocks 77, each will be given a number identifying the particular batch. See FIG. 10 where the block is numbered "Batch No. 12." The blocks 77 will then be mounted in the magazine 83. Suppose now that the next batch needed is mix number 12. The operator will turn the magazine until the block 77 marked "Batch No. 12" is in line with the frame 78. Then he will depress the handle 122, locking the indexing wheel 107 and opening the fluid conduits to the ram 112. Next he will actuate the valve which introduces fluid into the left end of the ram, causing the ram to move the rod 113 and pusher 95 to the right. This moves the batch block 77 into the frame 78 and as each screw 87 and plug 86 engages the end of the push rod aligned with it, it pushes the rod to the right, causing rotation of the photocell assembly 55 in the cut-off control unit B. A suitable latch will hold the batch block 77 with its reference surface 77a against the reference surface 79 at the right end of the frame 78, because the position of the block controls the weighing.

The plant is now set to weigh out Batch No. 12 and assuming that the main electric switch is closed, the operator will press the start button 123 which will close the holding coils on the bin gate valves 27 and each batcher will start the flow of its particular ingredient into its weigh hopper 20. The scale on each hopper will start to rotate and this rotation will be communicated simultaneously by the Selsyn motor drive to its connected cut-off control unit B, causing its flag 43 to move. When the scale has in it the amount of material for which the photocell assembly was set by the plug 86 in the batch control block, the flag 43 will interrupt the flow of light to the photocell 45 which will activate the photo relay 64 and break the holding coil 124 in the control circuit and the air valve 27 will allow the ram 26 to close the bin gate 25. This will occur at each of the scales. The interlocks and other control features having to do with the emptying of the weigh hoppers 20 and the initiation of a new weighing cycle are disclosed in my earlier patents, see for example Nos. 2,607,555 and 2,607,579.

If the operator next wishes to weigh out Batch No. 7, he will depress lever 122 to open the fluid conduits to the ram 112 and to make certain a pocket in the magazine 83 is in line to receive the batch control block No. 12 from the frame 78. Then he will energize the fluid line connected to the right end of the ram 112 so it will move rod 113 to the left. This movement of rod 113 causes the pusher 114 to eject the block 77 from the frame 78 and the pusher 115 brings the push rods 68, 72, 73, 74, 75 and 76 back to a zero position for the cut-off control unit B. The pushers 95 and 114 are clear of the sides of the magazine 83 so it can be rotated when the operator lets up on handle 122. He may, for example, rotate the magazine until the batch control block marked "Batch No. 7" is in line with the frame 78. Then he will repeat the foregoing operations.

It will be clear that there may be batches in which all six materials will not be included. In this case the plug 86 for the material not included is placed in the hole at the zero point and its screw 87 is set with its end 88 flush with the plug 86. Another simple way is to remove the plug 86 completely.

Where the block 77 is inserted in the frame 78 by hand as in FIG. 7, a latch 90 (FIG. 3) will hold the block in place.

While to comply with the statute I have illustrated the principle of my invention by the foregoing form of device, I want it clearly understood that I do not intend thereby to restrict the claims to this one embodiment.

What I claim is:

1. In a plural material batching plant having a plurality of individual weigh batchers, one or more material bins arranged to empty into each weigh batcher, control means for cutting off the flow of material from each material bin, a scale means related to each weigh batcher, and a scale cut-off control unit connected to each bin control and its related scale and adapted to be driven by the latter; the combination of a batch selecting mechanism including a movable element in each of said scale cut-off control units to position the control means for stopping the flow of material into its related weigh batcher; means for moving said element in each control unit to any desired weighing position, said means including a frame positioned in a predetermined relation to said last named means; a single insertable unitized batch control means, adapted to be secured in said frame said unitized batch control means providing control means for weighing out all of the ingredients of a predetermined batch formula composed of a plurality of ingredients; a plurality of individual positioned control elements positioned on said batch control means, each said control element being adapted for operatively controlling a related one of said means for moving a scale cut-off control unit, whereby upon insertion of said batch control means in said frame, each individual control element will dictate the movement of its related scale cut-off control to a position so the control will stop the weighing at the predetermined quantity, and upon insertion of a differently set batch control means, the related scale cut-off controls will be set to correspond to the individual control elements in the newly inserted control means so that a batch corresponding thereto will be weighed out.

2. The device of claim 1 in which the drive between each scale and its related cut-off control unit comprises a Selsyn-type transmitter on the scale and a Selsyn-type receiver on the cut-off control unit.

3. The device of claim 1 in which there is a magazine positioned adjacent the frame to receive a plurality of said insertable batch control means, said magazine having pockets for holding said batch control means in slidable position, means for aligning any selected one of said pockets with said frame to permit transfer of one of said batch control means into said frame or from said frame into said pocket.

4. The device of claim 3 in which there is a positioning ram for moving said batch control means between said pocket and said frame or vice versa, and means for actuating said ram.

5. The device of claim 3 in which said magazine has an indexing means to insure alignment of a pocket with said frame.

6. The device of claim 5 in which there is an interlock between said indexing means and the means for actuating the ram, whereby the latter cannot be actuated unless a pocket is aligned with said frame.

7. The device of claim 1 in which the means for moving each scale cut-off control unit includes a push rod which extends into said frame, and a drive means between said push rod and the movable element for positioning the latter.

8. A batch control block, for use in a batcher having a plurality of weigh batchers with cut-off mechanisms, a frame, a reference surface in the frame, and a plurality of settable control elements therein; said batch block being adapted to be inserted in said frame and having a base member, a reference surface, and a plurality of control elements, each control element having means for selectively positioning it on said base relative to said reference surface and in cooperative relation to one of the aligned settable control elements, each said control element comprising a plug adapted to be inserted in any selected one of a plurality of spaced holes in said base aligned with the settable control element, to thereby control the position of the latter, each said plug having a threaded screw normal to its axis and aligned for contact with the settable control element, to thereby effect a fine adjustment of the latter, whereby upon inserttion of said block in said frame so that the reference surface on said frame and on said block are in operative position, said settable control elements will be moved to correspond to the positions of said control elements on said block.

9. A batch control block, for use in a batcher having a plurality of weigh batchers with cut-off mechanisms, a frame, a reference surface in the frame, and a plurality of settable control elements therein; said batch block having a base member, a reference surface, a plurality of rows of spaced roles in said base, a plurality of control plugs, each said plug being adapted to be inserted in any selected one of said spaced holes in said base in alignment with a said settable control element to thereby control the position of the latter, each plug having a threaded screw normal to its axis and aligned for contact with said settable control element, to thereby effect a fine adjustment of the latter, whereby upon insertion of said block in said frame so that the reference surface on said frame and on said block are in operative position, said settable control elements will be moved to correspond to the positions of said control plugs on said block.

10. A batch control block, for use in a batcher having a plurality of weigh batchers with cut-off mechanisms, a frame having a reference surface, and a plurality of settable control elements in said frame, said batch block having a base member with a face, a plurality of longitudinal grooves along said face, and a reference surface at one end of said face; a plurality of control elements; and means for selectively positioning each control element in a said groove perpendicular to said face, whereby upon insertion of said block in said frame so that the reference surface on said frame and on said block are in operative position, said settable control elements can be slid along said grooves into engagement with their respective said control elements on said block.

References Cited in the file of this patent

UNITED STATES PATENTS

| | | |
|---|---|---|
| 1,812,620 | Braitmayer | June 30, 1931 |
| 2,208,284 | Weckerly | July 16, 1940 |
| 2,559,307 | Martinson | July 3, 1951 |
| 2,575,945 | De Vlieg | Nov. 20, 1951 |
| 2,607,555 | Noble | Aug. 19, 1952 |
| 2,607,579 | Noble | Aug. 19, 1952 |
| 2,687,272 | Schieser | Aug. 24, 1954 |

UNITED STATES PATENT OFFICE
CERTIFICATE OF CORRECTION

Patent No. 3,034,590            May 15, 1962

Bert Noble

It is hereby certified that error appears in the above numbered patent requiring correction and that the said Letters Patent should read as corrected below.

Column 3, line 8, after "so" insert -- that --; column 8, lines 68 and 69, strike out "positioned", each occurrence; column 10, line 12, for "roles" read -- holes --.

Signed and sealed this 13th day of November 1962.

SEAL)
test:

NEST W. SWIDER
testing Officer

DAVID L. LADD
Commissioner of Patents